Feb. 4, 1930.  W. K. LEWIS  1,746,197
ART OF SEPARATING HYDROCARBONS
Filed Aug. 16, 1922
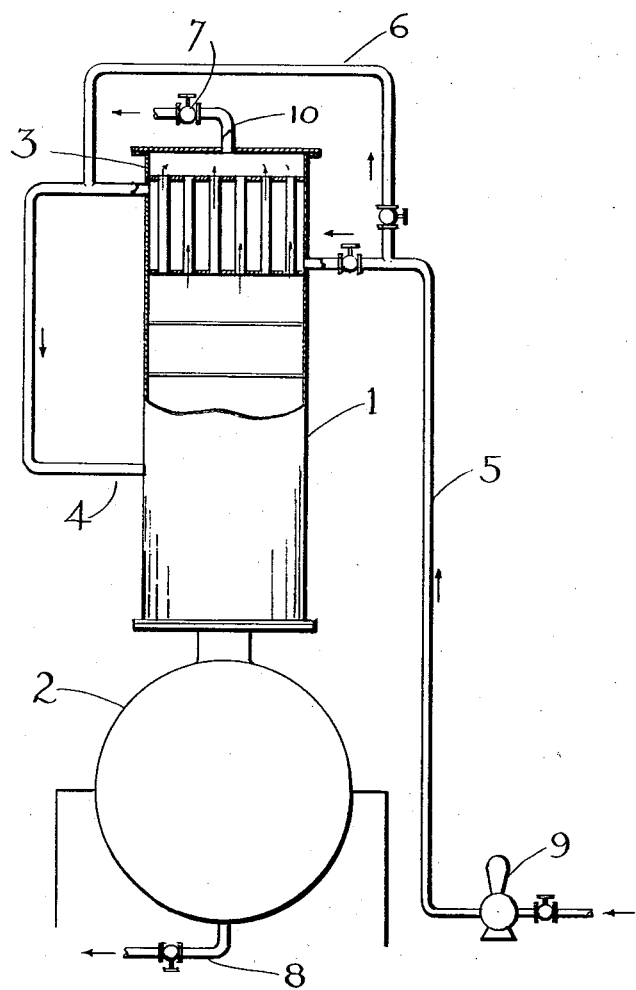
Inventor
Warren K. Lewis.
By
Attorney Patented Feb. 4, 1930

1,746,197

UNITED STATES PATENT OFFICE

WARREN K. LEWIS, OF NEWTON, MASSACHUSETTS, ASSIGNOR TO STANDARD OIL DEVELOPMENT COMPANY, A CORPORATION OF DELAWARE

ART OF SEPARATING HYDROCARBONS

Application filed August 16, 1922. Serial No. 582,137.

My invention relates to the art of separating hydrocarbons and will be fully understood from the following description.

In the separation of hydrocarbon mixtures by operating with fractionating columns, I have found that the capacity of a column can be very greatly increased by change in the mode of operation. In particular, the output rate in fractionating may be very greatly accelerated by maintaining pressure upon the column. The pressure desirable varies with the particular hydrocarbons to be separated, and all conditions must of course be in such relation that temperatures will not be incurred in the column, high enough to result in decomposition of the hydrocarbons being fractionated. For instance, in fractionating to separate kerosene from gas oil it is impracticable to maintain much pressure, since with increase of pressure the temperature factor in the case of such high-boiling stocks soon enters the range of cracking decomposition for the heavier hydrocarbons. With lower-boiling stocks however the possibilities of the use of pressure and the advantages resulting therefrom are increasingly marked.

In the practice of my invention any apparatus capable of effecting a suitable fractionation may be used, whether of plate type or filler type of tower to which the bottom heat necessary may be supplied by a steam coil or still 2, as shown in the figure. Preferably I employ a plate column 1 having bell caps and liquid overflow tubes and a still at the bottom and a partial condenser 3 at the top of a column. The point of feed may vary somewhat but advantageously is about one-third the way up the column from the bottom as shown at 4. The feed stock is forced by pump 9 through line 5 and is advantageously preheated by passage through partial condenser 3 and is then introduced into the tower at 4. It is possible to by-pass the partial condenser by diverting a portion or all the feed stock through line 6 as shown. Pressure is maintained in the column as required in view of the particular stock to be fractionated, by means of valve 7 positioned on the vapor outlet pipe 10. A drawoff connection 8 is provided for removing residues from the still.

The operation of the equipment is clearly shown by the following, where, for example, in making a separation between gasoline and kerosene hydrocarbons, a gauge pressure of 15 lbs. may be maintained on the column, the temperature difference between the bottom and the top of the column being approximately 150° F. The temperature of the liquid in the bottom of the column in most cases will be not less than 300° F. In separating between low-boiling hydrocarbons, pressures must be still further increased and may in some cases be as high for instance as 100-125 lbs. Where it is intended to sharply determine the lightest constituents which shall enter the finished product in view, as well as fractionate for the higher boiling hydrocarbons, it is desirable to have two columns running in series.

While in describing my invention I have referred to certain details, it will be understood that this is for the purpose of illustration rather than limitation, and the invention is to be considered as limited only as defined in the following claims.

What I claim is:

1. The method of separating gasoline from hydrocarbon mixtures containing kerosene and gasoline fractions, which comprises fractionating the mixture under a pressure of approximately 15 lbs. gauge in a group of fractionating zones in communication to produce an overhead vapor and a bottoms, partially condensing the overhead vapor to produce a partial condensate, returning the partial condensate to said group of zones, and heating the bottoms from said group of zones to the extent necessary to maintain a temperature difference between the top and bottom of said group of approximately 150° F. to produce an overhead vapor consisting substantially of gasoline fractions.

2. The method of separating gasoline from hydrocarbon mixtures consisting substantially of kerosene and gasoline fractions which comprises fractionating the mixture under a pressure of approximately 15 lbs. gauge in a group of fractionating zones in communication to produce an overhead vapor and a bottoms, partially condensing the overhead vapor to produce a partial condensate, returning the partial condensate to said group of fractionating zones and heating the bottoms from said group of zones to the extent necessary to maintain a temperature difference between the top and bottom of said group of approximately 150° F. to produce an overhead vapor consisting substantially of gasoline fractions.

WARREN K. LEWIS.